Nov. 27, 1951        L. E. PERRINE        2,576,475

INTERNAL-COMBUSTION ENGINE CARBURETION SYSTEM

Filed March 31, 1944        2 SHEETS—SHEET 1

Inventor
Lester E. Perrine
By
Blackmore, Spencer & Flint
Attorneys

Patented Nov. 27, 1951

2,576,475

UNITED STATES PATENT OFFICE 2,576,475

INTERNAL-COMBUSTION ENGINE
CARBURETION SYSTEM

Lester E. Perrine, Highland Park, Mich., assignor to General Motors Corporation, Detroit, Mich., a corporation of Delaware Application March 31, 1944, Serial No. 528,825

10 Claims. (Cl. 261—24)

To meter the fuel for an internal combustion engine in which the fuel is introduced into the air before the latter enters the cylinders of the engine, it has been the general practice to depend upon creation in the duct through which the air passes into the cylinders of a depression as a result of the flow of the air therethrough. A consequence of the creation of this depression has been to reduce the efficiency at higher speeds and the maximum output of the engine, especially at higher altitudes, and, in cases in which this has been minimized, to render the operation of the engine unsatisfactory at lower speeds or lower rates of flow of air into it since creation of a depression in the duct through which air passes into the cylinders of an engine as a result of the flow of air therethrough is a function of the resistance of the duct to the passage of air.

This invention resides in a fuel metering system for internal combustion engines of the type mentioned, which in nowise depends upon creation of a depression in the duct through which air passes into the cylinders of the engine and, consequently, makes possible the use of a substantially unrestrictive duct to conduct air into the cylinders with its advantages at higher speeds and in the matter of maximum output, especially at higher altitudes, of the engine without sacrificing anything in the matter of the operation of the engine at lower speeds and lower rates of flow of air into it.

The invention resides in or is based upon employment of the variations in the pressure of a fluid whose pressure is an index of the rate of flow of air into the cylinders of an engine, preferably, in the case of a supercharged engine, of the pressure created by the supercharger, to meter the fuel for the engine. The principle, although applicable to four stroke as well as to two stroke cycle engines, is especially advantageous in the case of the latter because in the case of them it can be utilized throughout the range of operation of the engine.

For a better understanding of the nature and objects of the invention reference is made to the following specification and the accompanying drawing wherein is described and illustrated the preferred embodiment of the invention applied to a two stroke cycle internal combustion engine.

Figure 1:
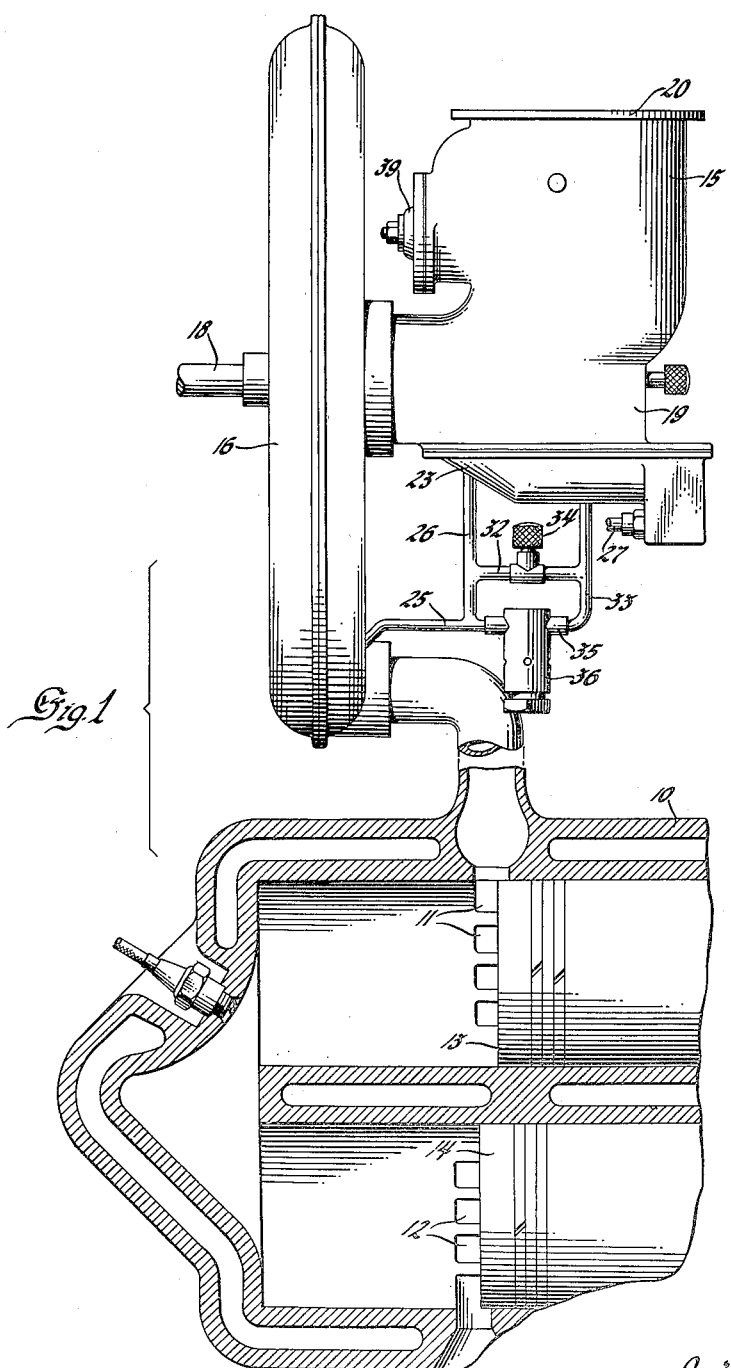
Figure 1 is a more or less diagrammatic view of a two stroke cycle internal combustion engine with a carbureting system in accordance with my invention.
Figure 2:
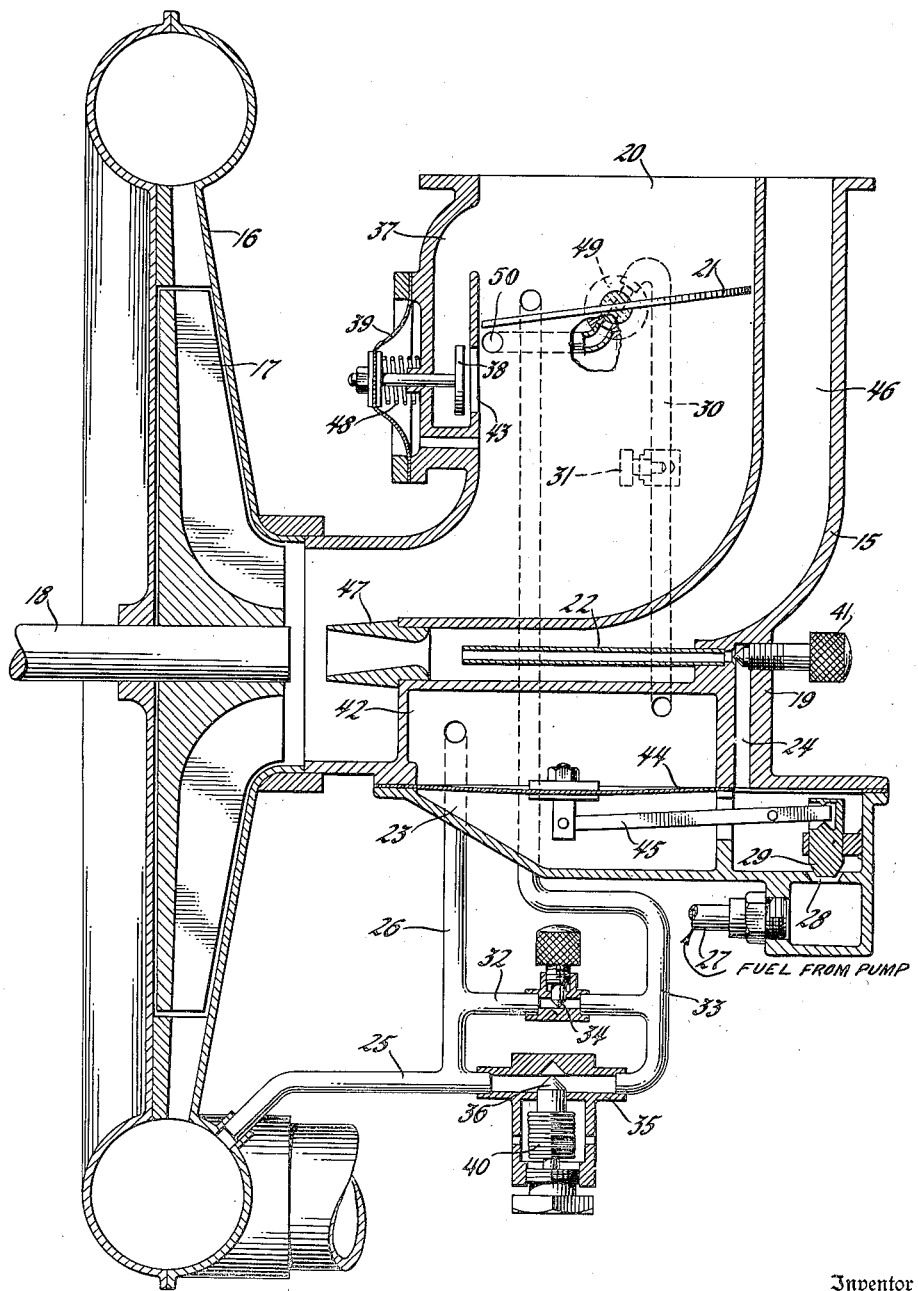
Figure 2 is an enlarged sectional view of the carburetor and supercharger with which the engine shown in Figure 1 is equipped.

In the drawing the reference character 10 indicates a U-cylinder two stroke cycle internal combustion engine with intake and exhaust ports 11 and 12 which are opened and closed by its pistons 13 and 14. Combustible mixture is supplied to the cylinders of the engine from a carburetor 15 by a centrifugal supercharger 16, whose impeller 17 is mounted on a shaft 18 which is driven from the crankshaft of the engine at a speed proportionate to the speed of the engine.

The carburetor 15 includes a body 19 through which extends from the atmosphere to the intake side of the supercharger 16 an air duct 20 in which there is disposed a butterfly type throttle valve 21. To introduce fuel into the duct 20 there is provided a fuel nozzle 22 to which fuel is supplied from a chamber 23 through a passage 24 in which there is an adjustable restriction 41 in the form of a needle valve. The fuel in the chamber 23 is, by reason of a passage 25—26 which communicates with the scroll of the supercharger, maintained under a pressure which varies with that in the scroll. As indicated in the drawing, fuel is supplied to the chamber 23 under a pressure which exceeds that in the scroll of the supercharger by a fuel pump (not shown in the drawing) through the pipe 27 and a port 28 controlled by a valve 29.

The pressure in the scroll of the supercharger varies with the pressure at the intake ports of the engine, which is an index of the rate of flow of air into the cylinders of the engine and, in the case of a two stroke cycle engine, always superatmospheric. Consequently, assuming that the pressure at the discharge end of the nozzle 22 remains constant, maintenance of the fuel in the chamber 23 under a pressure proportionate to the pressure in the scroll of the supercharger results, in the case of a two stroke cycle engine, in discharge, throughout the range of operation of the engine, of fuel from the nozzle at a rate proportionate to the rate of flow of air into the cylinders of the engine.

The metering of the fuel at this rate is clearly in nowise dependent upon creation of a depression in the duct 20. The duct 20 may, therefore, be entirely unrestrictive, with the attendant advantages at higher speeds and in the matter of maximum output, especially at higher altitudes, of the engine, without sacrificing anything in the matter of operation of the engine at lower speeds and lower rates of flow of air into it.

The elementary embodiment of my invention heretofore described may be refined in several respects to the end of making it adaptable to different engines and different conditions of operation of the same engine.

To provide for varying with respect to the pressure in the scroll of the supercharger the pressure under which the fuel in the chamber 23 is maintained and, thus, the ratio of the fuel discharged from the nozzle 22 to the air which enters the cylinders of the engine throughout the range of operation of the engine there may be provided, for example, a variable vent to the atmosphere from the tube 25—26. This is represented in the drawing by the tube 32—33 which branches off from the tube 25—26 and has in it an adjustable restriction 34 in the form of a needle valve. To facilitate adjustment during operation of the engine 10, the needle valve 34 may be made operable from a distance. To avoid waste of the fuel and air mixture discharged from the tube 32—33 its outer end may open into the duct 20 on the atmospheric side of the throttle valve 21 (and any other valve or valves which affect the flow of air through the duct).

To obviate variations in the pressure under which the fuel in the chamber 23 is maintained and the resultant variations in the richness of the mixture supplied to the cylinders of the engine as a result of differential leakage from the tube 25—26 through the tube 32—33 under different conditions of atmospheric pressure, there may be provided, for example, a vent to the atmosphere from the tube 25—26 which is controlled by an atmospheric pressure sensitive device so that the leakage from the tube 25—26 is not affected by changes in the pressure of the atmosphere. In the drawing this is represented by a tube 35 in parallel with the tube 32 and which has in it a restriction 36 in the form of a needle valve controlled by a sealed bellows 40.

To stabilize the speed of the engine 10 when it is operating with the throttle valve 21 closed and to relieve backfire pressure there may be provided around the throttle valve a by-pass 37 which has in it a valve 38. The valve 38 is urged away from the port 43 which it controls by a spring 48 and is actuated by a diaphragm 39 exposed on one side to the pressure of the atmosphere and on the other side to the pressure within the duct 20 on the engine side of the throttle valve. When the engine 10 is not operating the valve 38 occupies a position somewhat to the left of that in which it is shown in the drawing. When the engine is operating idly with the throttle valve 21 closed the valve 38 occupies a position, e. g., that in which it is shown in the drawing, between the first mentioned and its fully closed position. Any tendency toward increase in the speed of the engine beyond the preselected idle speed when the throttle valve is closed results in movement of the valve 38 toward its closed position. Any tendency toward decrease in the speed of the engine below this speed under this condition results in movement of the valve 38 in the opposite direction. Thus not only is the speed of the engine 10 when it is operating idly with the throttle valve 21 closed stabilized but also is any tendency of the engine to pick up speed when it is driven, for example by a "windmilling" propeller obviated. Upon backfire the valve 38, of course, opens wide and thus relieves the resulting pressure.

The chamber 23 may be a float chamber of the type usually found in the carburetors of automobile engines in which event the valve 29 which regulates admission of fuel into the chamber will be connected to the float and the pipe 25—26 will, of course, open into the chamber above the level of the fuel therein. But, since the engine 10 is intended for use on airplanes, the chamber 23 is preferably, as illustrated in the drawing, of a type whose operation is not affected by its position. In the form shown in the drawing, there is provided, instead of a float, a flexible diaphragm 44 which separates the chamber 23 from a chamber 42 next to it and to which the valve 29 is connected by a lever 45. The pipe 25—26 opens into the chamber 42 and the port 28 and the passage 24 into the chamber 23.

The carburetor 15 may be of any suitable type with the throttle valve anterior or posterior to the fuel nozzle. But it is preferably of the special anterior throttle valve type shown in the drawing in which there is provided an auxiliary air duct 46 into which opens the fuel nozzle 22 and which extends from the atmosphere into the main air duct 20 and terminates coaxially with and near the impeller 17 of the supercharger 16. An anterior throttle valve type carburetor into which the fuel is introduced into the main air duct in the zone and in the direction indicated is preferred because it minimizes icing and the troubles which result from it. Icing and the troubles which result from it are minimized because of the proximity to the hot impeller of the supercharger of the zone in which the fuel is discharged into the main air duct 20, because of the anterior position of the throttle valve 21, and because of the tendency of the impeller of the supercharger to throw off any ice which forms on it. The provision of the auxiliary air duct 46 with the fuel nozzle 22 therein instead of directly in the main air duct 20 affords the advantage of reducing the effect of the depression in the main air duct on the discharge of fuel from the nozzle when the throttle valve 21 is closed or nearly closed. Icing does not occur in the auxiliary air duct because there is too little air in it.

To prevent any undesired increase in the richness of the fuel and air mixture supplied to the cylinders of the engine as a result of the depression in the auxiliary air duct 46 when the throttle valve 21 is closed or nearly closed, there may be provided, for example, a restricted vent from the chamber 42 (or, if a float chamber is used, from above the level of the fuel therein) to the main air duct 20 on the engine side of the throttle valve 21. This is represented in the drawing by the pipe 30 which has in it an adjustable restriction 31 in the form of a needle valve. As shown in the drawing, the pipe 30 preferably opens into the main air duct immediately below the edge of the throttle valve which moves inwardly when the throttle valve is opened, at which point the reference character 50 is applied to it, and has in it a valve 49 which is closed as the throttle valve is opened so that the depression in the main air duct will not be applied to the vent after the throttle valve has been opened slightly and the vent will be closed by the time the throttle valve has been partly opened.

When carbureting apparatus of the type shown in the drawing is used on a two stroke cycle engine, the auxiliary air duct 46 preferably terminates in a venturi 47. The purpose of this venturi is to minimize the tendency of a two stroke cycle engine equipped with carbureting apparatus of this type to pick up speed when it is driven, for example, by a windmilling propeller, as a result of the increase in the rate of discharge of fuel and air mixture from the auxiliary air duct 46 which the increase in speed of the impeller of the supercharger induces. This increase in the rate of discharge of fuel and air mixture the venturi 47, correctly designed, minimizes by reason of its flow limiting characteristic.

Other and different embodiments of my invention than that specifically described herein and illustrated in the accompanying drawing may be effected. My invention is, consequently, not to be considered limited to the embodiment specifically described herein and illustrated in the accompanying drawing but only by the appended claims.

I claim:

1. In a two stroke cycle internal combustion engine, a pump for advancing air to a cylinder of the engine at such a rate that the pressure of the air on the engine side of the pump exceeds the pressure of the atmosphere, a duct through which air is conducted from the atmosphere to the pump, a throttle valve in the duct, the duct being substantially unrestrictive when the throttle valve is open, a fuel reservoir, means for advancing fuel into the reservoir, normally open means for transmitting pressure of the air on the engine side of the pump to the fuel in the reservoir to meter its introduction into the duct, and means for conducting fuel from the reservoir into the duct on the pump side of the throttle valve.

2. In a two stroke cycle internal combustion engine, a pump for advancing air to a cylinder of the engine at such a rate that the pressure of the air on the engine side of the pump exceeds the pressure of the atmosphere, a duct through which air is conducted from the atmosphere to the pump, a throttle valve in the duct, the duct being substantially unrestrictive when the throttle valve is open, a fuel reservoir, means for advancing fuel into the reservoir, and normally open means for transmitting pressure of the air on the engine side of the pump to the fuel in the reservoir to meter its introduction into the duct, and means for conducting fuel from the reservoir into the duct.

3. In an internal combustion engine, a pump for advancing air to a cylinder of the engine, a duct through which air is conducted from the atmosphere to the pump, a throttle valve in the duct, the duct being substantially unrestrictive when the throttle valve is open, a fuel reservoir, means for advancing fuel into the reservoir, means for transmitting pressure of the air on the engine side of the pump to the fuel in the reservoir to meter its introduction into the duct, and means for conducting fuel from the reservoir into the duct on the pump side of the throttle valve.

4. In an internal combustion engine, a pump for advancing air to a cylinder of the engine at such a rate that the pressure of the air on the engine side of the pump exceeds the pressure of the atmosphere. a duct through which air is conducted from the atmosphere to the pump, a throttle valve in the duct, a fuel reservoir, means for advancing fuel into the reservoir, means for transmitting pressure of the air on the engine side of the pump to the fuel in the reservoir to meter its introduction into the duct substantially as long as the pressure of the air on the engine side of the pump exceeds the pressure of the atmosphere, and means for conducting fuel from the reservoir into the duct on the pump side of the throttle valve.

5. In an internal combustion engine in which there is fluid whose pressure is an index of the rate of flow of air into a cylinder of the engine, a duct through which air is conducted from the atmosphere into the cylinder, a throttle valve in the duct, means for conducting fuel into the duct on the engine side of the throttle valve, means to meter the introduction of fuel into the duct by pressure of the mentioned fluid, and means for varying the pressure of the mentioned fluid by which the introduction of the fuel into the duct is metered, including a vent which communicates with the duct on the engine side of the throttle valve.

6. In an internal combustion engine, a pump for advancing air to a cylinder of the engine, a duct through which air is conducted from the atmosphere to the pump, a throttle valve in the duct, the duct being substantially unrestrictive when the throttle valve is open, a fuel reservoir, means for advancing fuel into the reservoir, means for transmitting pressure of the air on the engine side of the pump to the fuel in the reservoir to meter its introduction into the duct, and means for conducting fuel from the reservoir into the duct on the pump side of the throttle valve.

7. In an internal combustion engine in which there is fluid whose pressure is an index of the rate of flow of air into a cylinder of the engine, a duct through which air is conducted from the atmosphere into the cylinder, a throttle valve in the duct, means for introducing a mixture of fuel and air into the duct including a duct which communicates with the atmosphere and terminates within the first specified duct on the engine side of the throttle valve and a fuel duct which terminates within the second specified duct, and means to meter the discharge of fuel from the third specified duct by pressure of the mentioned fluid.

8. In an internal combustion engine in which there is fluid whose pressure is an index of the rate of flow of air into a cylinder of the engine, a duct through which air is conducted from the atmosphere into the cylinder, a throttle valve in the duct, means for introducing a mixture of fuel and air into the duct including a duct which communicates with the atmosphere and terminates within the first specified duct on the engine side of the throttle valve and a fuel duct which terminates within the second specified duct, means to meter the discharge of fuel from the third specified duct by pressure of the mentioned fluid, and means to reduce the effect of the pressure in the first specified duct on the discharge of fuel from the third specified duct.

9. In an internal combustion engine, a pump for advancing air to a cylinder of the engine, a duct through which air is conducted from the atmosphere to the pump, a throttle valve in the duct, the duct being substantially unrestrictive when the throttle is open, a fuel reservoir, means for introducing a mixture of fuel and air into the duct including a duct which communicates with the atmosphere and terminates within the first specified duct on the engine side of the throttle valve and a fuel duct which terminates within the second specified duct, means for transmitting pressure of the air on the engine side of the pump to the fuel in the reservoir to meter its discharge from the third specified duct, and means to reduce the effect of the pressure in the first specified duct on the discharge of fuel from the third specified duct.

10. In an internal combustion engine in which there is fluid whose pressure is an index of the rate of flow of air into a cylinder of the engine, a duct through which air is conducted from the atmosphere into the cylinder, a throttle valve in the duct, means for conducting fuel into the duct on the engine side of the throttle valve, means to meter the introduction of fuel into the duct by pressure of the mentioned fluid, and means for varying the pressure of the mentioned fluid by which the introduction of the fuel into the duct is metered, including a vent which communicates with the duct on the engine side of the throttle valve when the throttle valve is closed and means for closing the vent when the throttle valve is opened.

LESTER E. PERRINE.

REFERENCES CITED

The following references are of record in the file of this patent:

UNITED STATES PATENTS

| Number | Name | Date |
|---|---|---|
| 1,456,527 | Young | May 29, 1923 |
| 1,531,832 | Bates | Mar. 31, 1925 |
| 2,008,143 | Mock | July 16, 1935 |
| 2,070,009 | Goodman | Feb. 9, 1937 |
| 2,159,173 | Mennesson | May 23, 1939 |
| 2,223,381 | Mock | Dec. 3, 1940 |
| 2,228,000 | Chandler | Jan. 7, 1941 |
| 2,232,392 | Kittler | Feb. 18, 1941 |
| 2,305,912 | Thompson | Dec. 22, 1942 |
| 2,341,257 | Wunsch | Feb. 8, 1944 |
| 2,348,113 | Davis | May 2, 1944 |
| 2,419,679 | Embshoff | Apr. 29, 1947 |

FOREIGN PATENTS

| Number | Country | Date |
|---|---|---|
| 523,895 | Great Britain | July 25, 1940 |
| 377,949 | Italy | Jan. 16, 1940 |